(12) United States Patent
Cupit et al.

(10) Patent No.: US 11,668,333 B2
(45) Date of Patent: Jun. 6, 2023

(54) CLAMP MECHANISM AND RELATED TRAY

(71) Applicant: Quipt, LLC, Bend, OR (US)

(72) Inventors: John A. Cupit, Bend, OR (US); Dexter L. Stoltz, Emsworth, PA (US)

(73) Assignee: QUIPT, LLC, Bend, OR (US)

( * ) Notice: Subject to any disclaimer, the term of this patent is extended or adjusted under 35 U.S.C. 154(b) by 60 days.

(21) Appl. No.: 17/600,240

(22) PCT Filed: Nov. 20, 2019

(86) PCT No.: PCT/US2019/062334
§ 371 (c)(1),
(2) Date: Sep. 30, 2021

(87) PCT Pub. No.: WO2020/205005
PCT Pub. Date: Oct. 8, 2020

(65) Prior Publication Data
US 2022/0205468 A1   Jun. 30, 2022

Related U.S. Application Data

(60) Provisional application No. 62/827,895, filed on Apr. 2, 2019.

(51) Int. Cl.
*F16B 2/06* (2006.01)
*F16B 5/06* (2006.01)
(Continued)

(52) U.S. Cl.
CPC ............ *F16B 2/065* (2013.01); *F16B 5/0614* (2013.01); *F16M 13/022* (2013.01);
(Continued)

(58) Field of Classification Search
CPC .......... F16B 2/065; F16B 5/0614; F16B 5/06; F16B 2001/0035; F16B 2/00; F16M 13/022; A47G 23/0225
See application file for complete search history.

(56) References Cited

U.S. PATENT DOCUMENTS 3,850,398 A   11/1974  Kantor
4,307,864 A   12/1981  Benoit
(Continued)

FOREIGN PATENT DOCUMENTS

KR         101820653         1/2018

OTHER PUBLICATIONS

International Search Report filed in PCT/US2019/062334 dated Jan. 17, 2020.

*Primary Examiner* — Tan Le
(74) *Attorney, Agent, or Firm* — Rankin, Hill & Clark LLP

(57) ABSTRACT

A clamp mechanism includes a clamp configured to receive an associated support structure, a connecting assembly attached to the clamp, and a mount assembly configured to secure an apparatus to the clamp. The connecting assembly includes an engagement member selectively movably into engagement with the associated support structure for securing the associated support structure within the clamp. The mount assembly includes a first mount connected the clamp and a second mount connected to the apparatus and adapted to be rotationally indexed relative to the first mount to secure the apparatus in at least two positions relative to the clamp.

14 Claims, 15 Drawing Sheets

(51) Int. Cl.
*F16M 13/02* (2006.01)
*F16B 2/00* (2006.01)
*F16B 1/00* (2006.01)
*A47G 23/02* (2006.01)

(52) U.S. Cl.
CPC ............ *A47G 23/0225* (2013.01); *F16B 2/00* (2013.01); *F16B 5/06* (2013.01); *F16B 2001/0035* (2013.01)

(56) References Cited

U.S. PATENT DOCUMENTS

| | | | |
|---|---|---|---|
| 4,887,784 A * | 12/1989 | Kayali | F16M 13/022 248/231.51 |
| 5,123,619 A | 6/1992 | Tomlinson | |
| 5,322,253 A | 6/1994 | Stevens | |
| 5,522,527 A | 6/1996 | Tsai | |
| 5,853,158 A * | 12/1998 | Riggle | A47G 23/0225 248/278.1 |
| 5,996,957 A | 12/1999 | Kurtz | |
| 6,481,684 B1 | 11/2002 | Farmer | |
| 6,505,802 B2 | 1/2003 | Fowler | |
| 6,601,813 B1 | 8/2003 | Kager | |
| 6,766,912 B1 * | 7/2004 | Gibbs | A47G 23/0225 211/74 |
| 6,910,429 B1 | 6/2005 | Matay | |
| 6,983,918 B1 | 1/2006 | Leasure | |
| 7,093,742 B2 | 8/2006 | Steven, III | |
| 7,152,834 B2 | 12/2006 | Hsu | |
| 7,300,030 B2 | 11/2007 | Michalo | |
| 7,527,600 B2 | 5/2009 | Farmer | |
| 7,564,682 B2 | 7/2009 | Liou | |
| 7,793,904 B2 | 9/2010 | Scarton | |
| 8,132,764 B2 * | 3/2012 | Kuipers | F16M 11/041 248/230.8 |
| 8,695,957 B2 | 4/2014 | Quintania | |
| 8,870,044 B1 | 10/2014 | Freese | |
| 9,121,423 B2 | 9/2015 | Sharpe | |
| 9,341,308 B2 | 5/2016 | Lacy | |
| 9,850,924 B2 | 12/2017 | Vogtherr | |
| 10,039,423 B2 | 8/2018 | Schultz | |
| 2002/0070324 A1 | 6/2002 | Huang | |
| 2011/0233354 A1 | 9/2011 | Mitchell | |
| 2013/0134266 A1 | 5/2013 | Lai | |
| 2015/0001359 A1 | 1/2015 | Catchings | |
| 2015/0090845 A1 | 4/2015 | Trelford | |
| 2016/0045048 A1 * | 2/2016 | Katz | A47G 23/0225 220/737 |
| 2016/0317237 A1 | 11/2016 | Geiger | |

\* cited by examiner

CLAMP MECHANISM AND RELATED TRAY

BACKGROUND

The present disclosure relates to a clamp mechanism for holding apparatus or equipment (i.e., a tray) in at least two positions relative to a support structure to which the clamp mechanism is releasably mounted.

Clamp mechanisms with features for mounting apparatus or equipment (i.e., trays) to existing support structures are known. A typical clamp mechanism includes a clamp that grasps the support structure between a fixed jaw and a movable jaw. Typically a jaw operator mechanism for moving the movable jaw into engagement with and securely grasping the support structure includes a screw carried in a threaded opening in the clamp. Another known feature of a clamp mechanism is the ability to rotate the equipment relative to the support structure so that the equipment can be properly presented to the user.

SUMMARY

According to one aspect of the present disclosure, a clamp mechanism comprises a clamp configured to receive an associated support structure, a connecting assembly attached to the clamp, and a mount assembly configured to secure an apparatus to the clamp. The connecting assembly includes an engagement member selectively movably into engagement with the associated support structure for securing the associated support structure within the clamp. The mount assembly includes a first mount connected the clamp and a second mount connected to the apparatus and adapted to be rotationally indexed relative to the first mount to secure the apparatus in at least two positions relative to the clamp.

According to another aspect of the present disclosure, a clamp mechanism comprises a clamp configured to receive an associated support structure, a connecting assembly attached to the clamp, and a mount assembly attached to the clamp and configured to secure an apparatus to the clamp. The connecting assembly includes an engagement member selectively movably into engagement with the associated support structure for securing the associated support structure within the clamp. The mount assembly includes a first mount provided as part of the clamp and a second mount provided as part of the apparatus. The first and second mounts are configured to allow one of the first and second mounts to be rotationally indexed relative to the other of the first and second mounts to secure the apparatus in at least two positions relative to the clamp.

DETAILED DESCRIPTION

Figure 5:
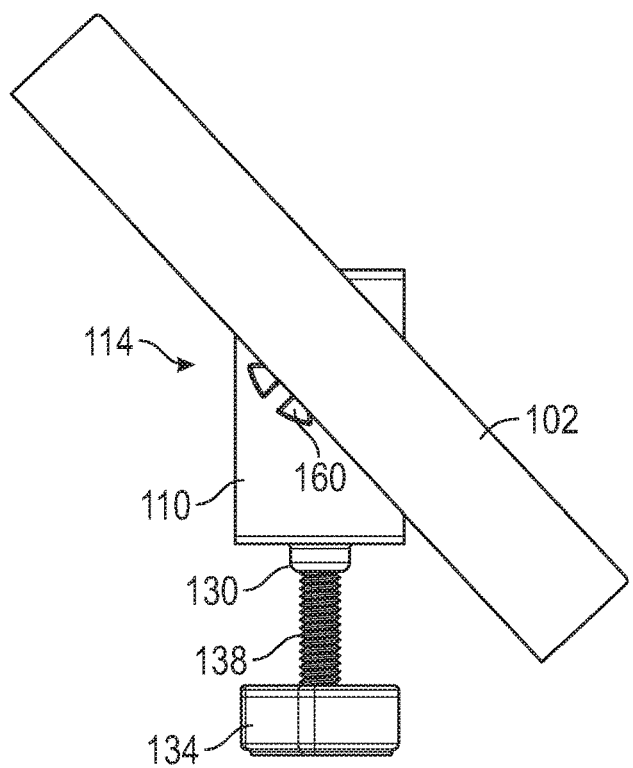
FIG. 5 is an elevational view of the clamp mechanism including the tray wherein the tray is in a third position relative to the clamp mechanism.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-5 illustrate a clamp mechanism 100 including apparatus or equipment 102 mounted thereto according to one aspect of the present disclosure. The apparatus or equipment described herein is the illustrated tray 102; however, it should be appreciated that alternative apparatus or equipment configured for attachment to the clamp mechanism 100 is contemplated. According to the depicted aspect, the clamp mechanism 100 includes a clamp 110, a connecting assembly 112 secured to the clamp 110 and adapted to connect the clamp mechanism 100 to an associated support structure (i.e., a pole, a table top, or the like), and a mount assembly 114 secured to the clamp 110 and adapted to connect the tray 102 to the clamp mechanism 100. The exemplary clamp mechanism 100 is configured to secure the tray 102 in a first position where, for example, the tray is faced upward or horizontal (FIGS. 1-3), a second position where, for example, the tray is faced sideways (FIG. 4), and a third position where, for example, the tray is positioned between the first and second positions, for example, at a forty-five degree angle relative to the first and second positions (FIG. 5).

Figure 6:
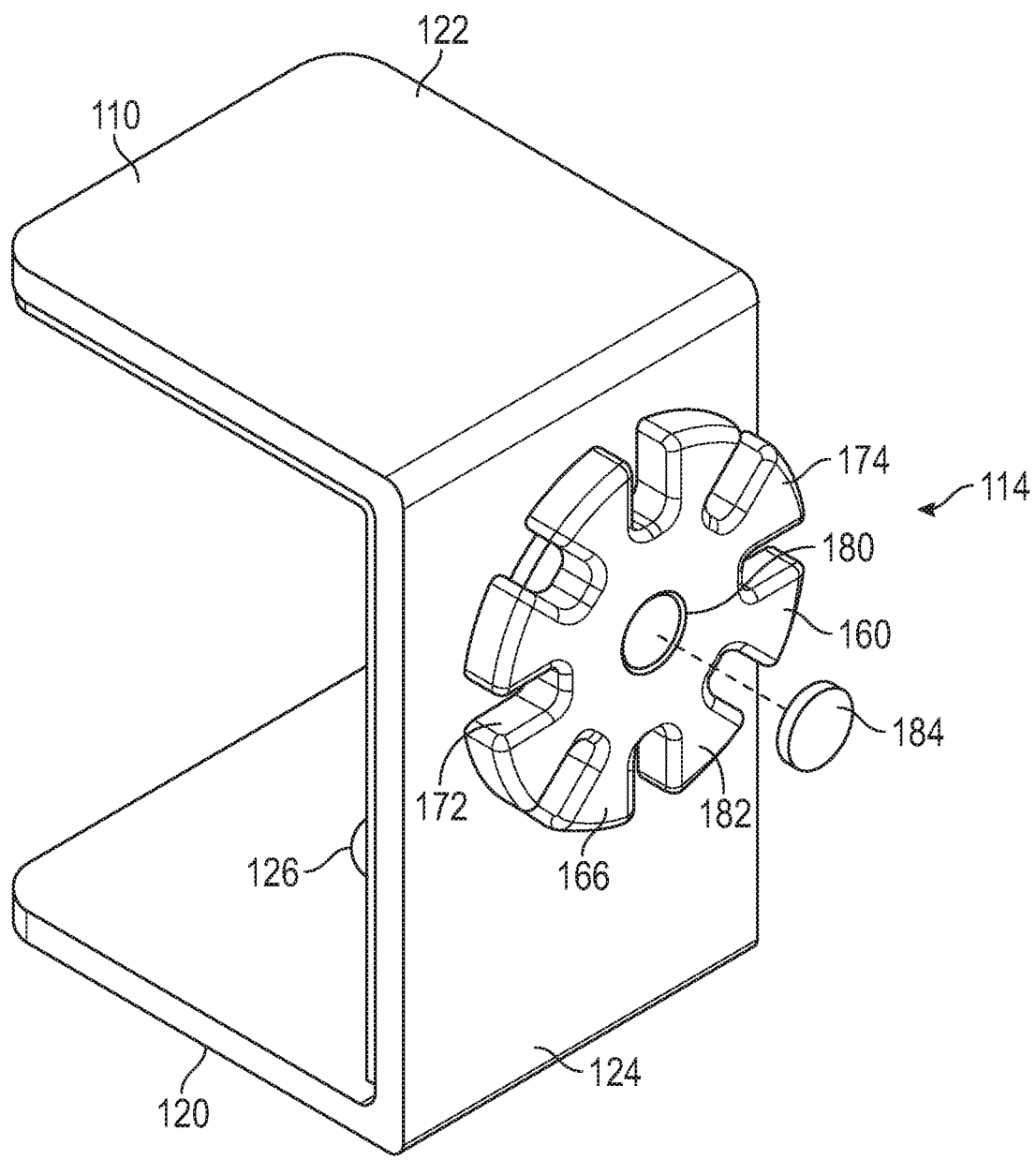
FIG. 6 is a perspective view of a clamp of the clamp mechanism, the clamp including a first mount of a mount assembly.

The clamp 110, which can have a generally inverted sideways U-shape, includes a bottom wall 120, a top wall 122, and a sidewall 124 extending between and interconnecting respective end portions of the bottom and top walls. The bottom wall 120 includes an opening 126 (FIG. 6) for the connecting assembly 112. According to one aspect, a threaded insert 130 for use with the connecting assembly 112 can be affixed in the opening 126 of the bottom wall 120. However, it should be appreciated that in lieu of the insert 130 the opening 126 can be a threaded opening.

As indicated previously, the connecting assembly 112 mounts the clamp 110 to an associated support structure. As shown, the connecting assembly 112 includes a first or bottom shoe 134, a second or top shoe 136, and a threaded rod 138 extending between and interconnecting the bottom and top shoes 134, 136. To secure the threaded rod 138, each of the bottom and top shoes 134, 136 can include a boss having a threaded bore adapted to threadingly receive an end portion of the threaded rod 138 (only the boss 140 of the bottom shoe 134 is shown). The connecting assembly 112 can be attached to the clamp 110 in the following exemplary manner. A first nut 146 is threaded onto the threaded rod 138. The bottom shoe 134 is screwed onto the threaded rod 138 and the first nut 146 is tightened against the bottom shoe 134. The threaded rod 138 with the bottom shoe connected thereto can then be threaded through the insert 130. A second nut 148 is threaded onto the threaded rod 138, and the threaded rod 138 is screwed onto the top shoe 136. The second nut 148 is then tightened against the top shoe 136. It should be appreciated that the use of the first and second nuts 146, 148 prevents the unthreading of the threaded rod 138 from the bottom and top shoes 134, 136.

To secure the clamp 110 to an associated support structure, the support structure is first positioned between the top wall 122 and the top shoe 136 of the connecting assembly 112. The bottom shoe 134 of the connecting assembly 112 is then rotated in a first direction (i.e., a clockwise direction) which threads the threaded rod 138 upward through the insert 130 moving the top shoe 136 toward the top wall 122. The top shoe 136 engages the support structure and presses the support structure against the top wall 122. To prevent scaring of the support structure from the clamp 110, a rubber pad 144 can be adhered to at least one of the top wall 122 and the sidewall 124 of the clamp 110. It should be appreciated that the rubber pad 144 when compressed by the support structure can prevent movement of clamp 110 on the support structure. To release the clamp 110 from the support structure, the bottom shoe 134 is rotated in a second direction (i.e., a counterclockwise direction), which, in turn, moves the top shoe 136 away from the top wall 122.

The exemplary mount assembly 114 comprises an indexer or first mount 160 (FIG. 6) and an equipment or second mount 162 (FIGS. 7-9) configured to be connected to the first mount 160. According to the present aspect shown in FIG. 8, the first mount 160 includes wheel 166 fixedly secured to the sidewall 124 of the clamp 110 via a hub 168. As depicted, the first mount 160 is integral with the clamp 110 to define a unitary component; although, this is not required. The wheel 166 has a plurality of open-ended (i.e., generally U-shaped) pockets 172 arrayed around its periphery, to create a generally sprocket-shaped appearance for the wheel, where a plurality of identical and, optionally, equally spaced teeth 174 are defined by the pockets. As will be described below, the pockets 172 selectively receive the second mount 162 allowing for angular adjustment of the tray 102 relative to the clamp 110. Further depicted, a cavity 180 can be formed in an outer surface 182 of the wheel 166, and a first magnet 184 can be securely received (e.g., press-fitted) in the cavity.

Figure 1:
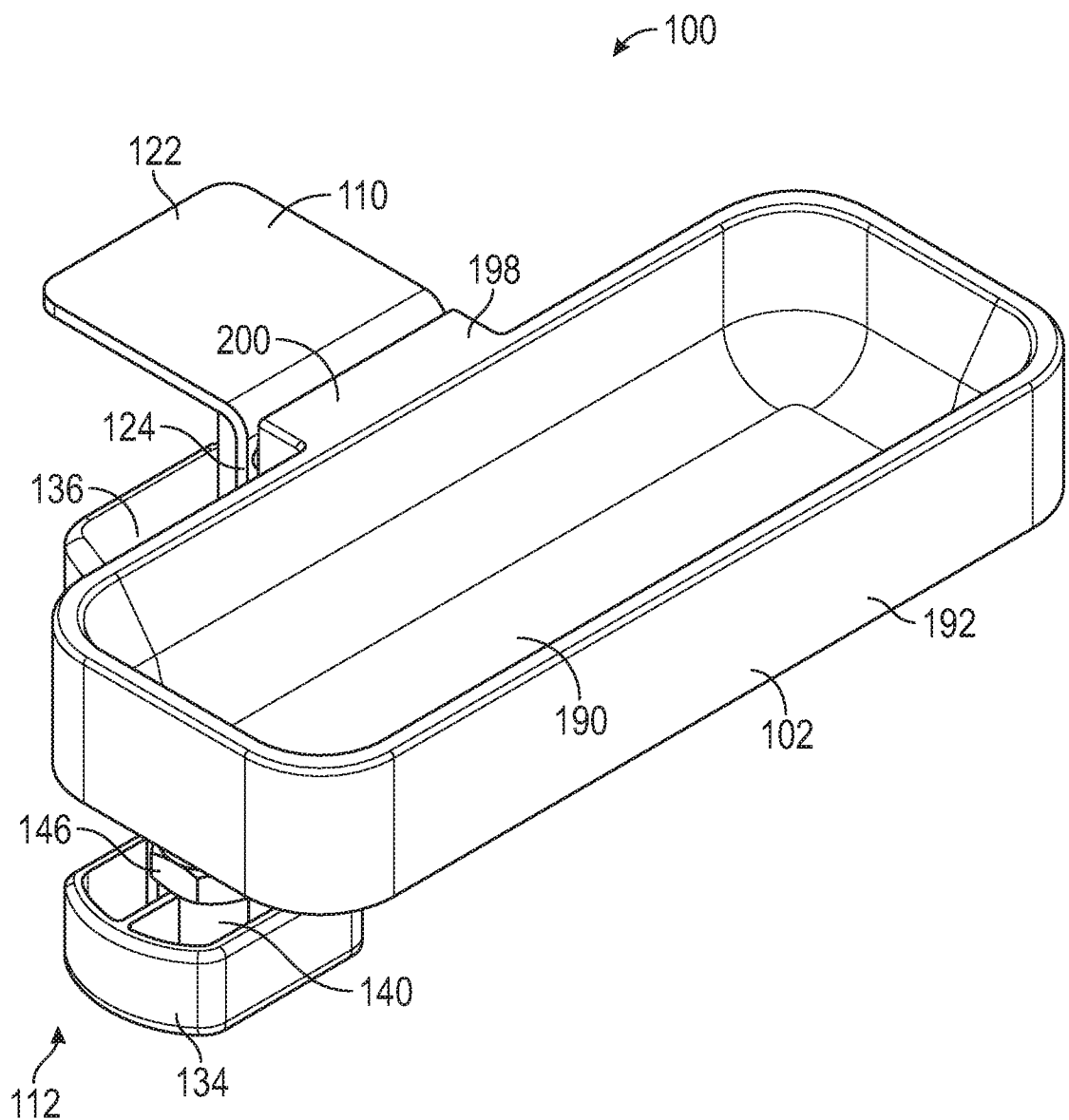
FIG. 1 is a perspective view of a clamp mechanism including a tray according to one aspect of the present disclosure, the tray is in a first position relative to the clamp mechanism.
Figure 2:
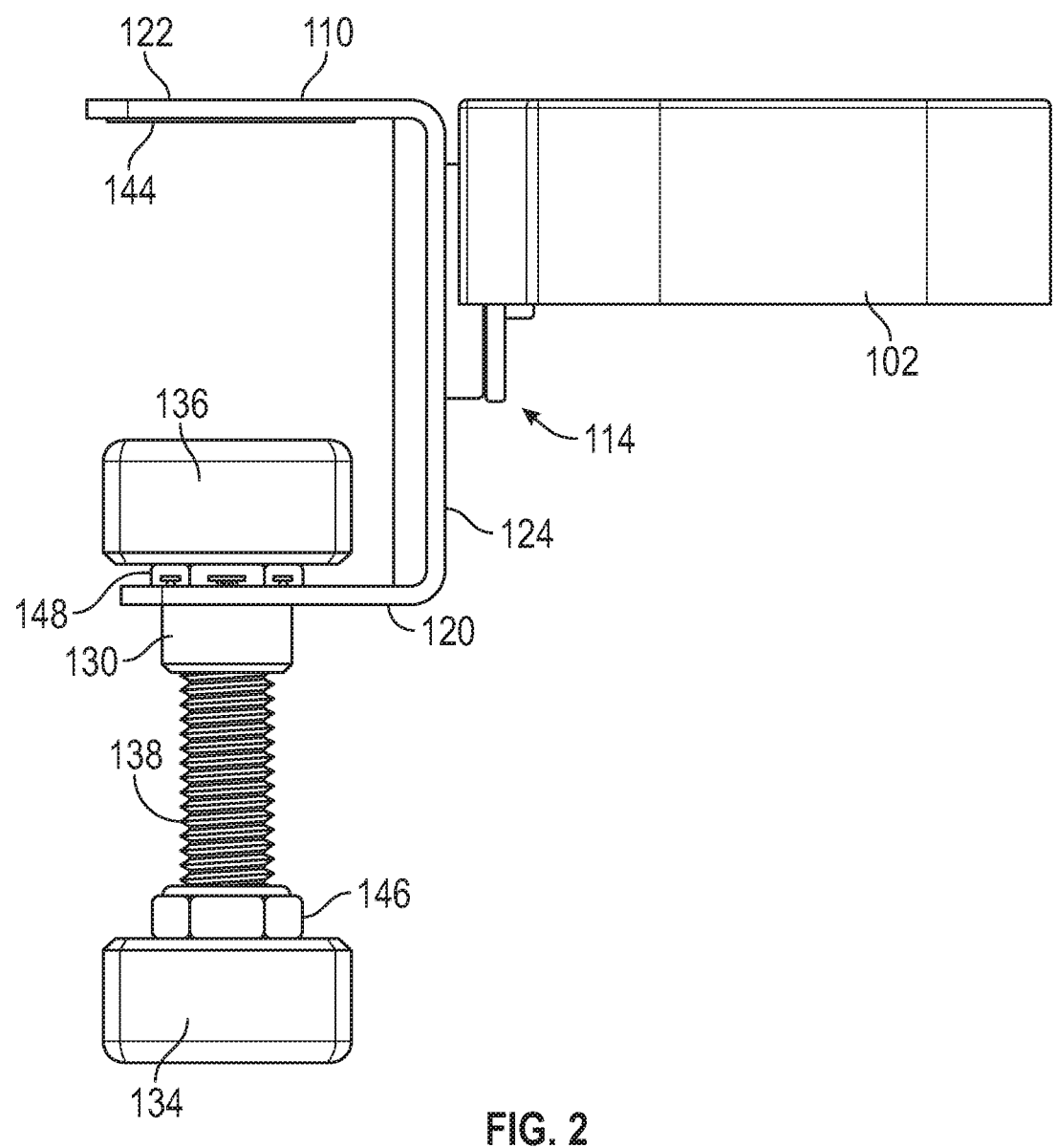
FIGS. 2 and 3 are elevational views of FIG. 1.
Figure 3:
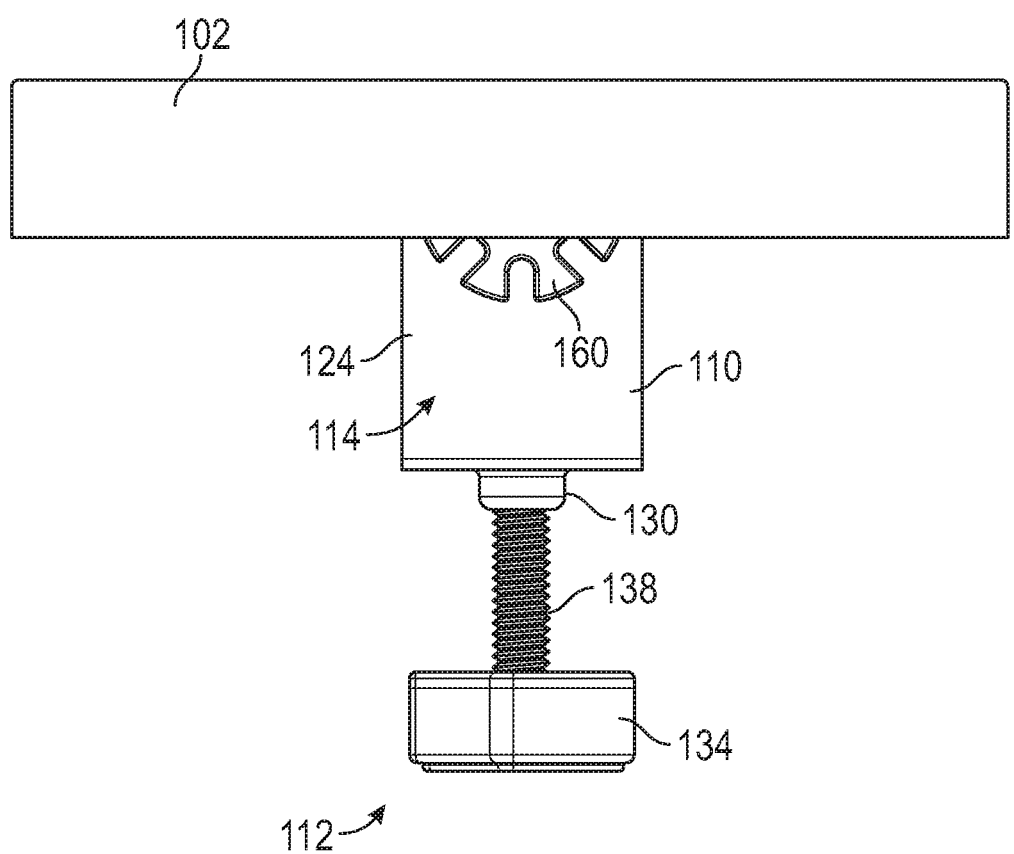
Figure 4:
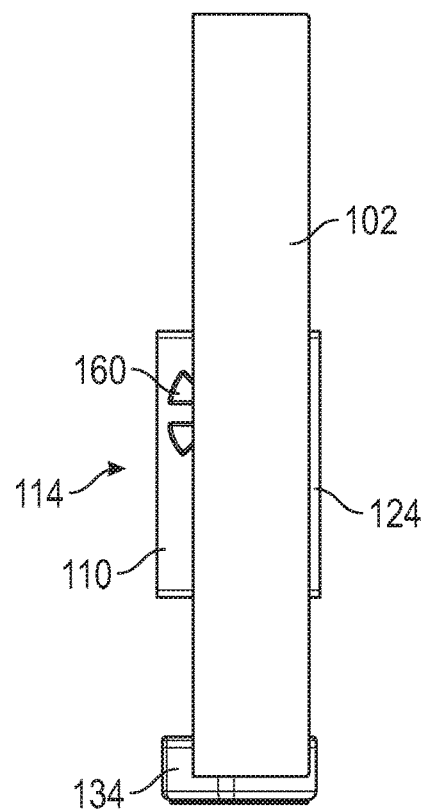
FIG. 4 is an elevational view of the clamp mechanism including the tray wherein the tray is in a second position relative to the clamp mechanism.
Figure 7:
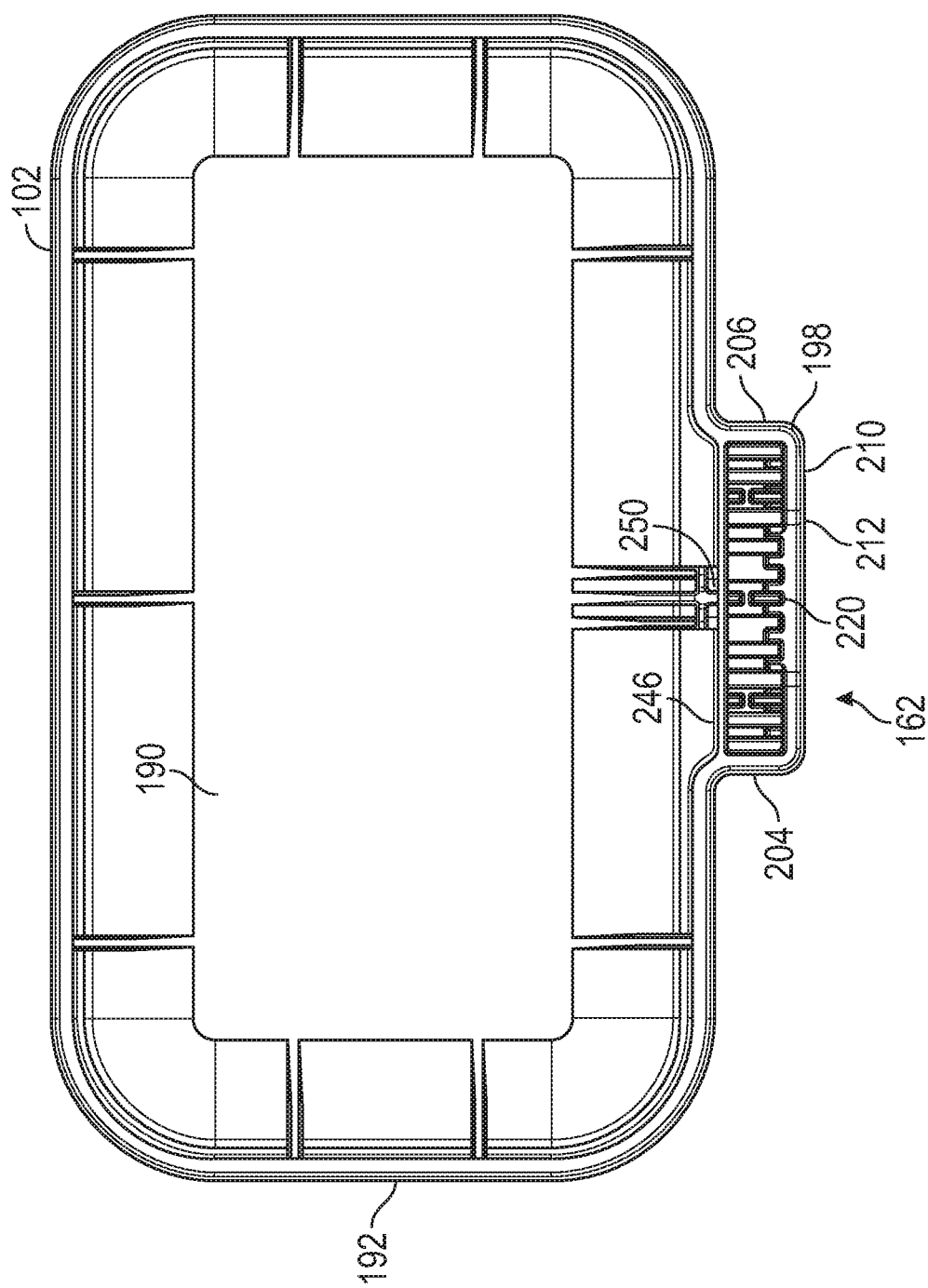
FIG. 7 is a bottom elevational view of the tray showing a second mount of a mount assembly.
Figure 8:
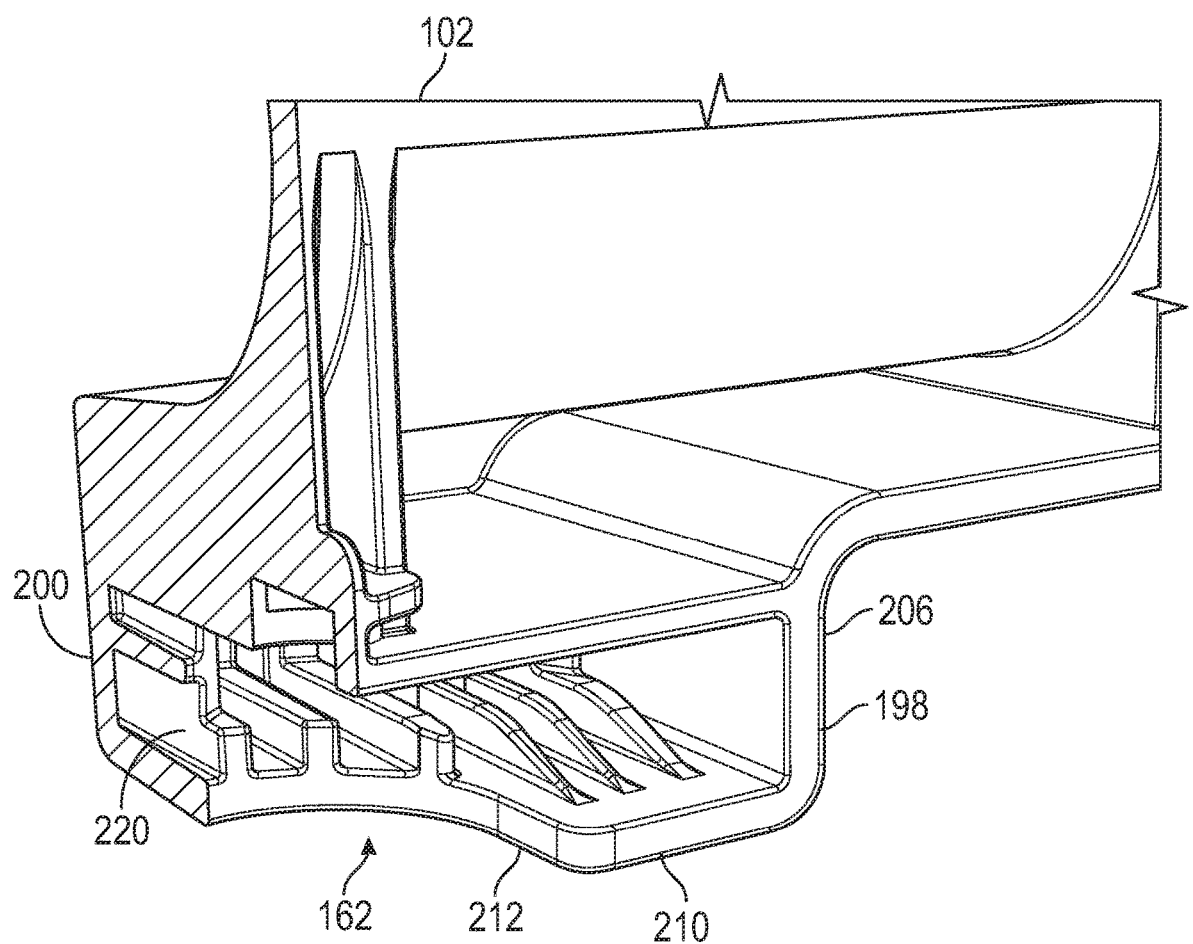
FIGS. 8 and 9 are perspective cross-sectional views of the tray.
Figure 9:
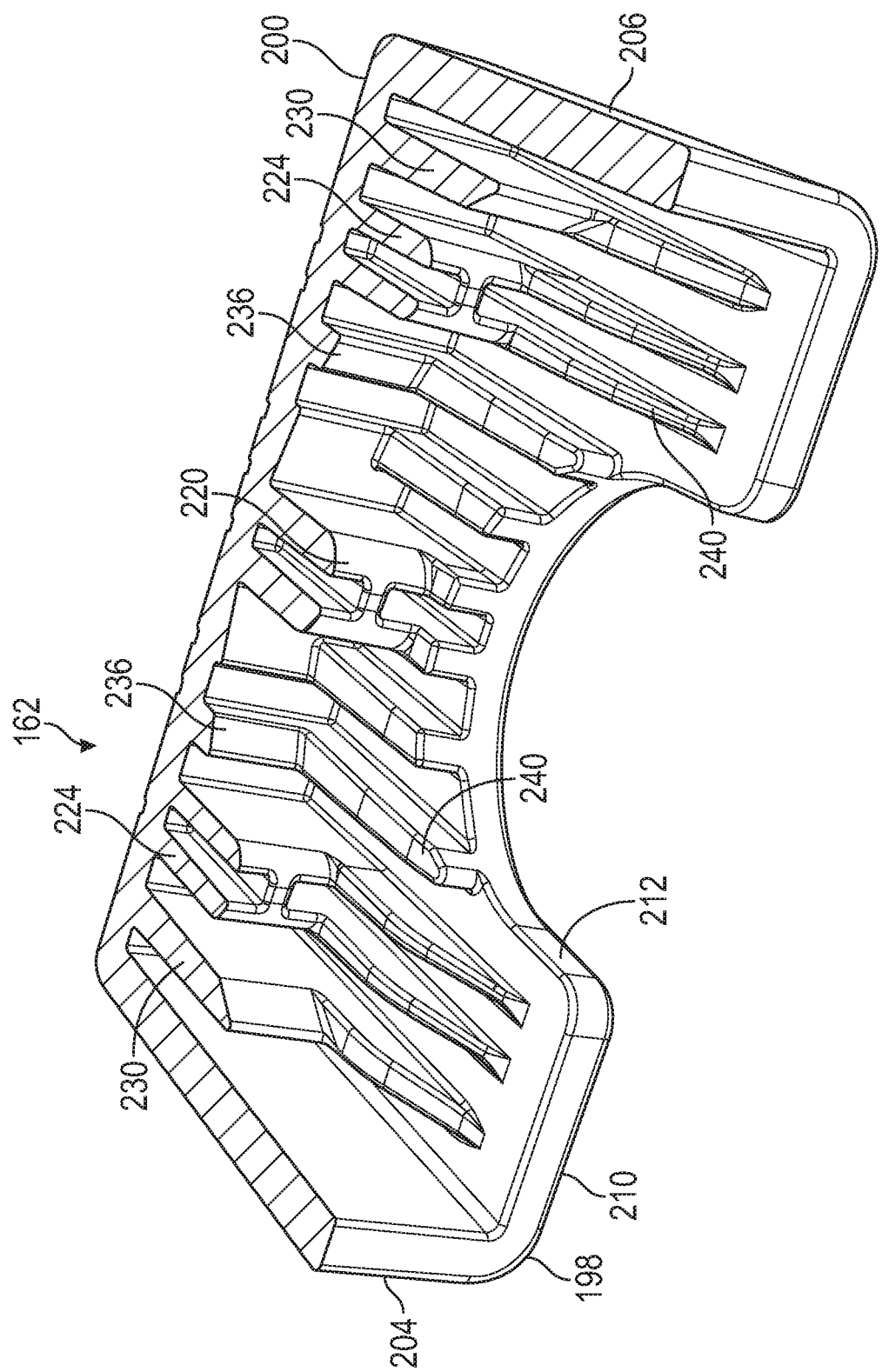

The second mount 162 is provided as part of the tray 102. In FIGS. 1 and 7, the tray 102 includes a bottom wall 190 and a sidewall 192. The sidewall 192 includes a housing 198 extending outwardly therefrom. The housing 198, which is best depicted in FIGS. 7-9, has a top wall 200, opposed sidewalls 204, 206, and an outer end wall 210. The outer end wall 210 includes a cutout 212 coved upward toward the top wall 200 and dimensioned to receive the hub 168 of the first mount 160. The second mount 162 is defined by at least one tab 220 depending from the top wall 200 of the housing 198 for engaging the wheel 166. In the depicted aspect, the at least one tab 220 is a mating tab and the second mount 162 is further defined by a pair of contact tabs 224 which flank the mating tab 220. The contact tabs 224 can also depend from the top wall 200. Further provided within the housing 198 is at least one alignment tab for aligning the wheel 166 within the housing 198 to allow for engagement between the first and second mounts 160, 162. In the depicted aspect, the at least one alignment tab can be a first pair of alignment tabs 230, one provided between the sidewall 204 and one of the contact tabs 224 and the other provided between the sidewall 206 and the other contact tab 224. In the depicted aspect, the at least one alignment tab can be a second pair of alignment tabs 236, one provided between the mating tab 220 and one of the contact tabs 224 and the other provided between the mating tab 220 and the other contact tab 224. Further, an inner surface of the outer end wall 210 can include ribs 240, which can be generally ramped shaped, to offset the wheel 166 from the inner surface of the outer end wall 210, which in turn can press the wheel toward an inner end wall 246 of the housing 198.

Figure 10:
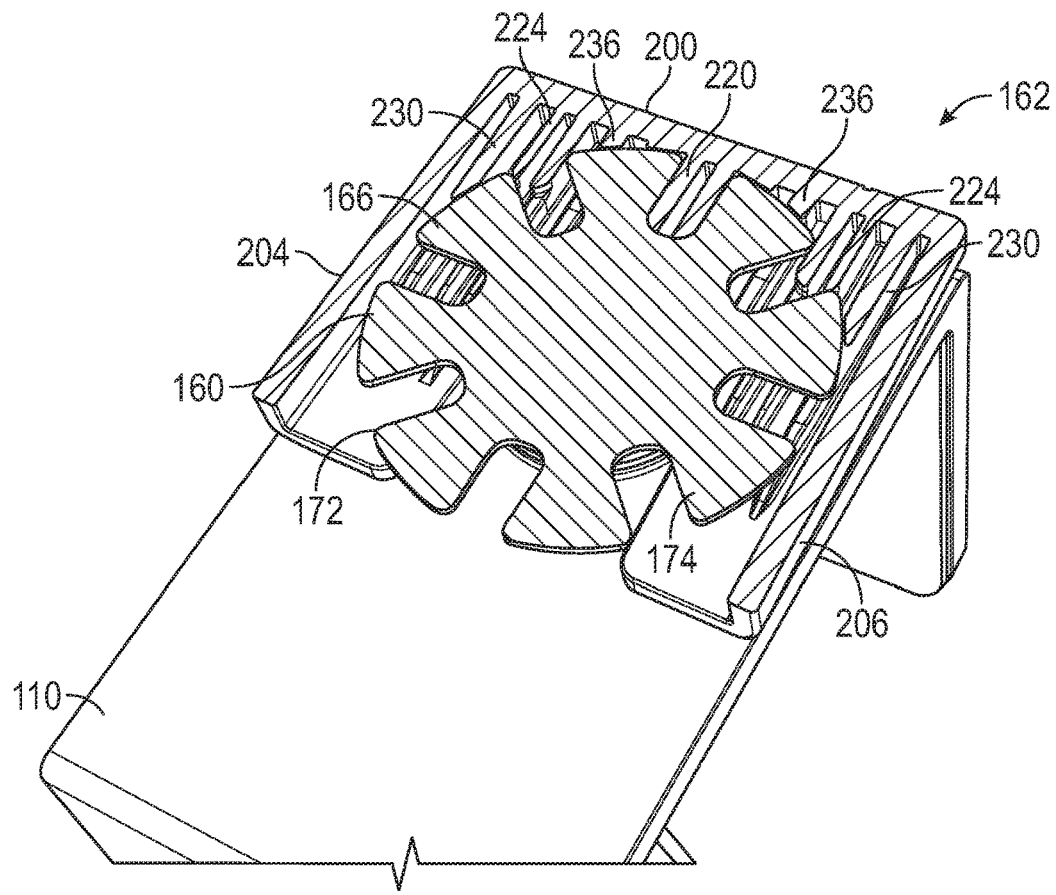
FIG. 10 is a cross-section of the clamp mechanism including the tray.
Figure 11:
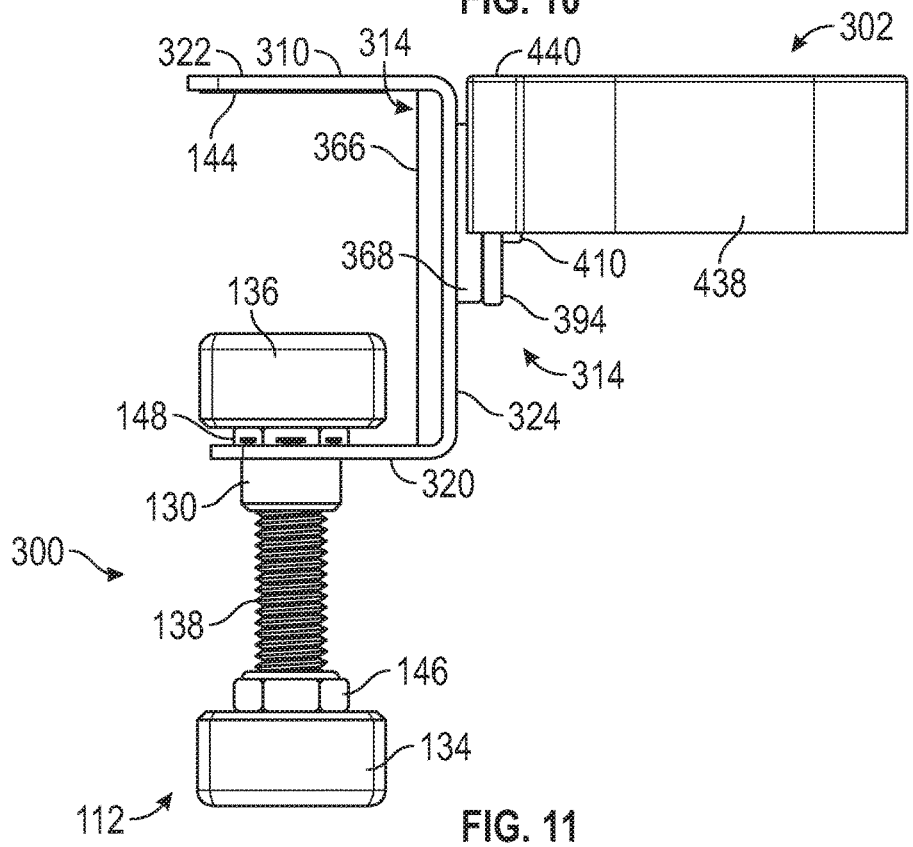
FIGS. 11 and 12 are elevational views of a clamp mechanism including a tray according to another aspect of the present disclosure, the tray is in a first position relative to the clamp mechanism.
Figure 12:
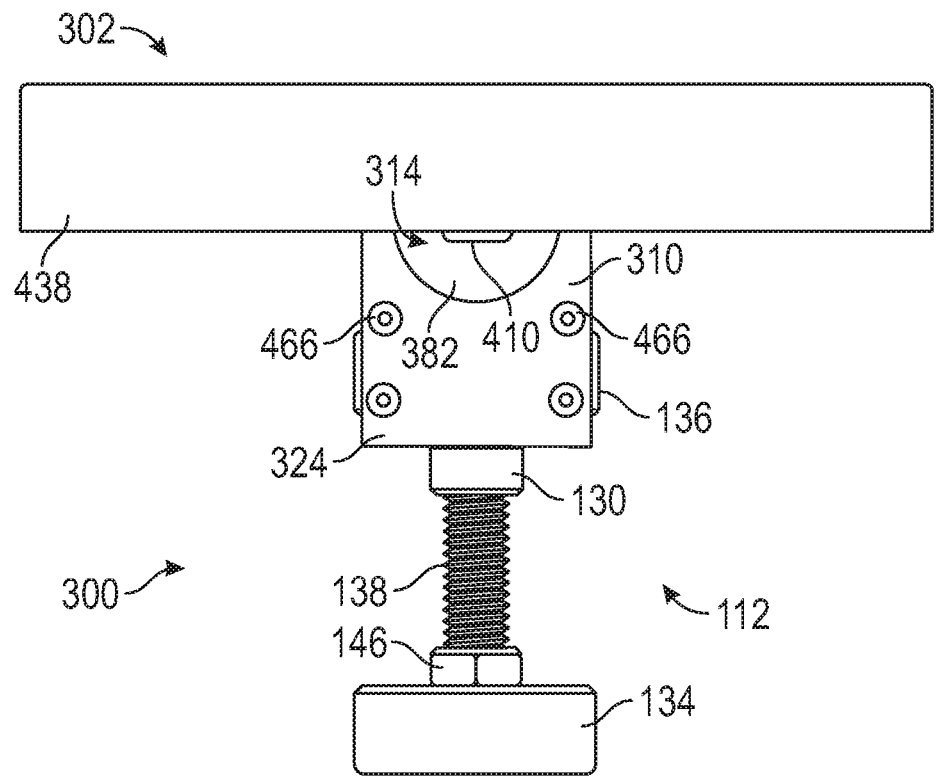

As shown in FIG. 10, the mating tab 220 is dimensioned to be received within one of the pockets 172 of the wheel 166 of the first mount 160. The contact tabs 224 are configured to engage the teeth 174 of the wheel 166 immediately adjacent the teeth 174 that define the pocket 172 receiving the mating tab 220. The contacts tabs 224 together with the alignment tabs 230, 236 engage the periphery of the teeth 174 to properly position the wheel within the housing. As indicated, the pockets 172 for the mating tab 220 are angularly spaced and define the various angular positions for mounting of the tray 102 to the clamp mechanism 100. It should be appreciated that the angular spacing between the pockets 172 is an angular measurement extending circumferentially about axis defined by the wheel 166. In the depicted aspect of the wheel, three angular positions for the tray 102 are provided (i.e., horizontal, vertical, and oblique), with an angular spacing of approximately forty-five degrees between the pockets 172. Further depicted in FIG. 7, a second magnet 250 is mounted to the inner sidewall 246. The second magnet 250 has a polarity opposite to that of the first magnet 184. Therefore, the first magnet 184 mounted to the first mount 160 and the second magnet 250 mount to the housing 198 further secures the tray 102 to the clamp mechanism 100.

Accordingly, the clamp mechanism 100 is configured to secure the tray 102 in at least three positions, a first position where, for example, the tray is faced upward (FIGS. 1-3), a second position where, for example, the tray is faced sideways (FIG. 4), and a third position where, for example, the tray is positioned between the first and second positions (FIG. 5). To secure the tray 102 in, for example, the first position, the first mount 160 on the clamp 110 is placed into the housing 198 of the tray for engagement with the second mount 162 as described above. To move the tray 102 from the first position to, for example, the second position, the tray is pulled off the clamp 110, which disengages the first and second mounts, and rotated to the second position. In the second position, the first mount 160 is again placed into the housing 198 of the tray for engagement with the second mount 162, and the position of the tray 102 relative to the clamp mechanism 100 can be maintained.

Figure 13:
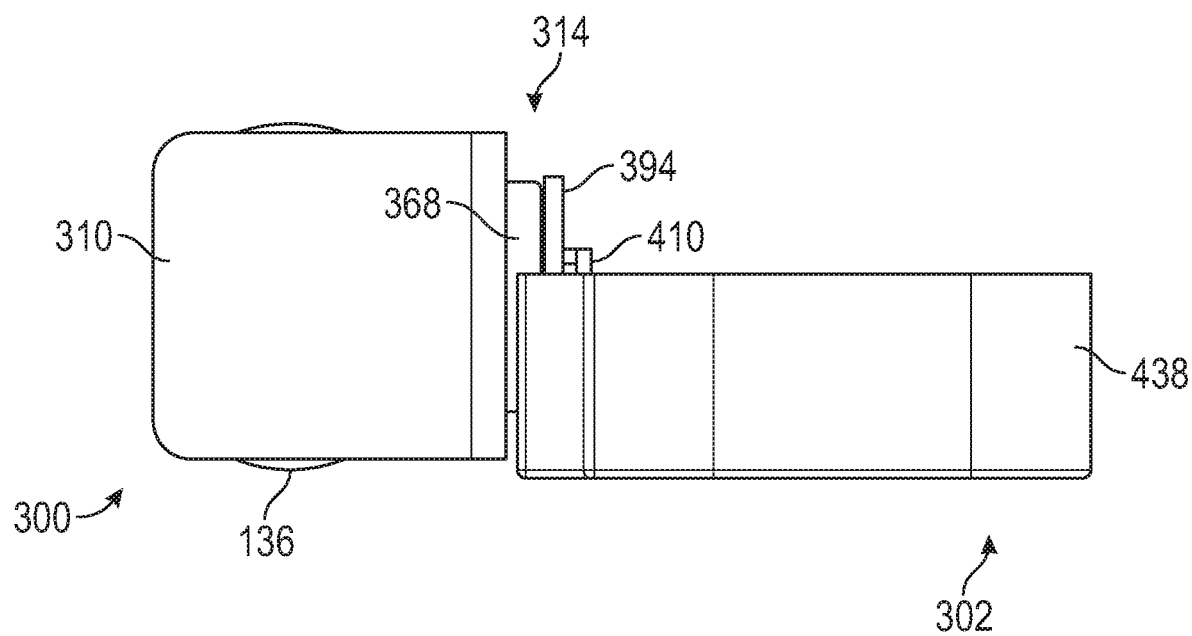
FIG. 13 is an elevational view of the clamp mechanism including the tray wherein the tray is in a second position relative to the clamp mechanism.
Figure 14:
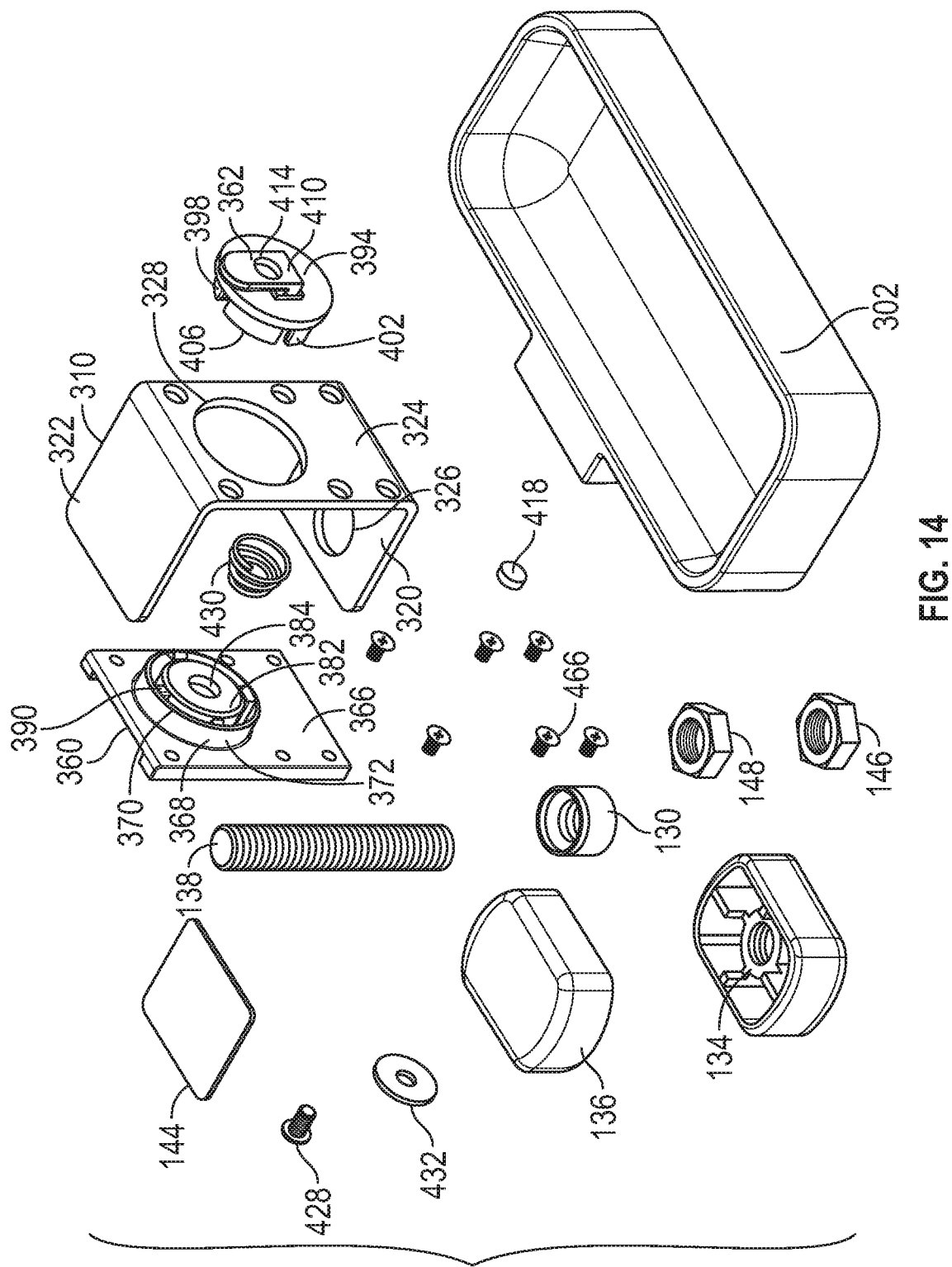
FIG. 14 is an exploded view of FIG. 11.

FIGS. 11-14 illustrate a clamp mechanism 300 including apparatus or equipment 302 mounted thereto according to the present disclosure. The apparatus or equipment described herein is the illustrated tray 302; however, again it should be appreciated that alternative apparatus or equipment configured for attachment to the clamp mechanism 100 is contemplated. According to the depicted aspect, the clamp mechanism 300 includes a clamp 310, the connecting assembly 112 secured to the clamp 310 and adapted to connect the clamp mechanism 300 to an associated support structure (i.e., a pole, a table top, or the like), and a mount assembly 314 secured to the clamp 310 and adapted to connect the tray 302 to the clamp mechanism 300. The exemplary clamp mechanism 300 is configured to secure the tray 302 in at least two positions, a first position where, for example, the tray is faced upward (FIGS. 11 and 12) and a second position where, for example, the tray is faced sideways (FIG. 13).

Similar to the clamp 110, the clamp 310, which can have a generally inverted sideways U-shape, includes a bottom wall 320, a top wall 322, and a sidewall 324 extending between and interconnecting respective end portions of the bottom and top walls. The bottom wall 320 includes an opening 326 for the connecting assembly 112, and the sidewall 324 includes an opening 328 for the mount assembly 314.

The features of the exemplary mount assembly 314 are best depicted in FIGS. 14 and 16-18. The mount assembly 314 comprises an indexer or first mount 360 and an equipment or second mount 362 rotatably connected to the first mount 360. The first mount 360 includes a plate 366 sized to be received between the bottom and top walls 320, 322 of the clamp 310. An annular flange 368 projects perpendicularly from the plate 366. As shown, the annular flange 368 is integral with the plate 366 to define a unitary component; although, this is not required. According to one aspect, the annular flange 368 has a generally sideways U-shape in cross-section including an inner wall 370, an outer wall 372, and an inner end wall 376 interconnecting the inner and outer walls. The inner wall 370 of the annular flange 368 defines a bore 380 which extends through the plate 366. An outer end wall 382 extends inwardly from the inner wall 370 and covers the bore 380. An opening 384 is located in the outer end wall 382 for the second mount 362. Located in the space between the inner and outer walls 370, 372 of the annular flange 368 are at least two dividers 390. The at least two dividers 390 are angularly spaced and define the at least two positions for mounting of the tray 302 to the clamp mechanism 300. It should be appreciated that the angular spacing between the dividers is an angular measurement extending circumferentially about axis defined by the annular flange 368. In the depicted aspect, four dividers 390 are provided, with an angular spacing of approximately ninety degrees between the dividers 390.

The second mount 362 comprises a plate 394 having extending from a first surface 396 thereof a circular flange 398 sized to be received by the annular flange 368. The circular flange 398 is provided with a plurality of cutouts 402 which separates the circular flange 398 into angularly spaced tabs 406. The cutouts 402 are sized to receive the dividers 390 and the tabs 406 are sized to be received between the dividers 390. This arrangement allows the second mount 362 to be rotationally indexed on the first mount 360. An attachment member 410 for mounting of the tray 302 extends from a second surface 412 of the plate 394. The attachment member 410 can be provided with a recess 414 for securely receiving a magnet 418. The second mount 362 further includes a boss 424 extending from the first surface 396 of the plate 394 and concentric with the circular flange 398. The boss 424 is sized to be slidingly received in the opening 384 provided in the outer end wall 382 of the first mount 360. The boss 424 defines a threaded bore 426 for a fastener 428 which secures the second mount 362 to the first mount 360. The fastener 428 further secures a spring 430 within the bore 380 of the first mount 360, the spring 430 provided between the outer end wall 382 and a washer 432. The spring 430 holds the second mount 362 in engagement with the first mount 360.

Figure 16:
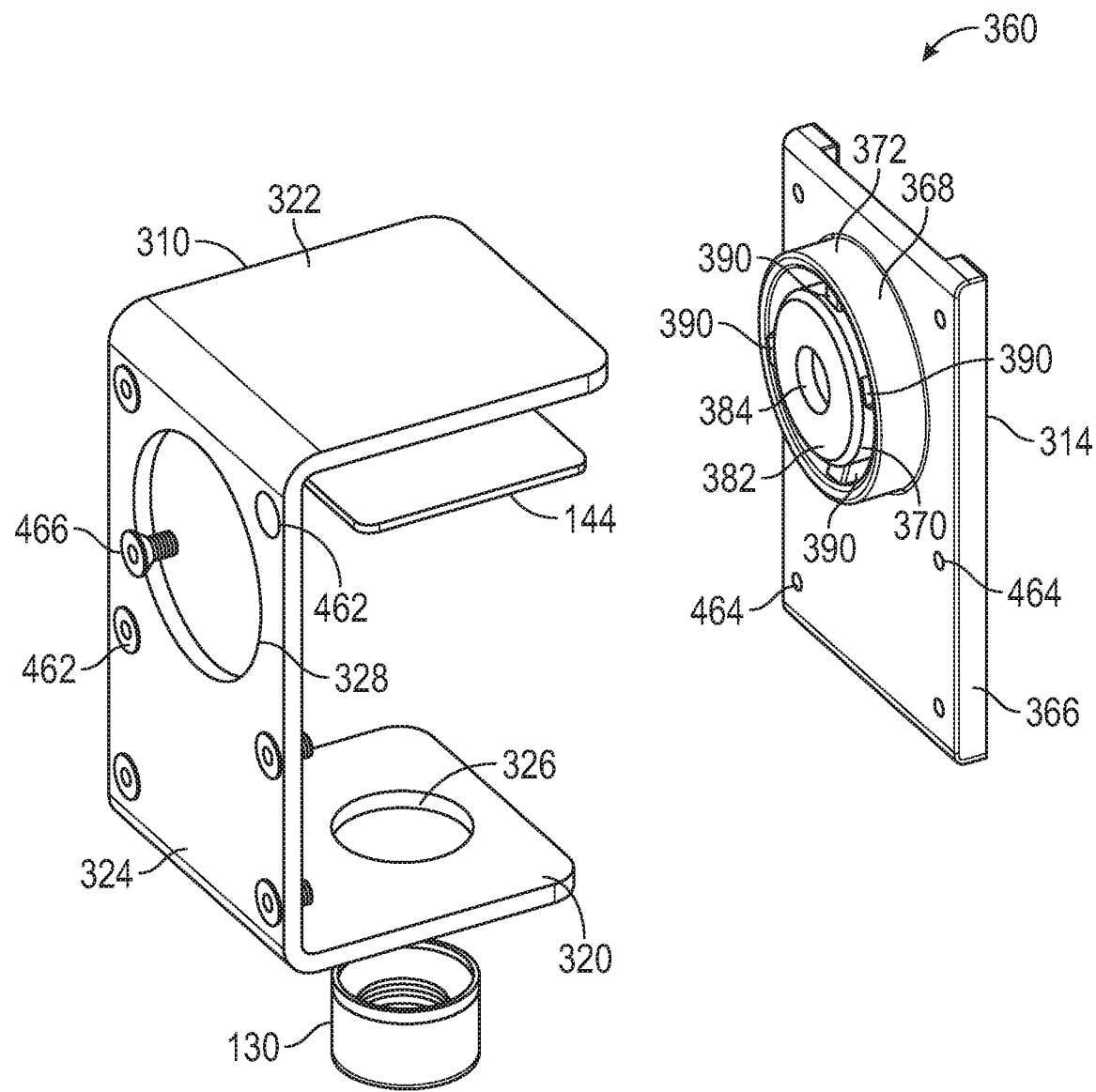
FIGS. 16 and 17 are perspective views showing the assembly of the clamp mechanism.
Figure 17:
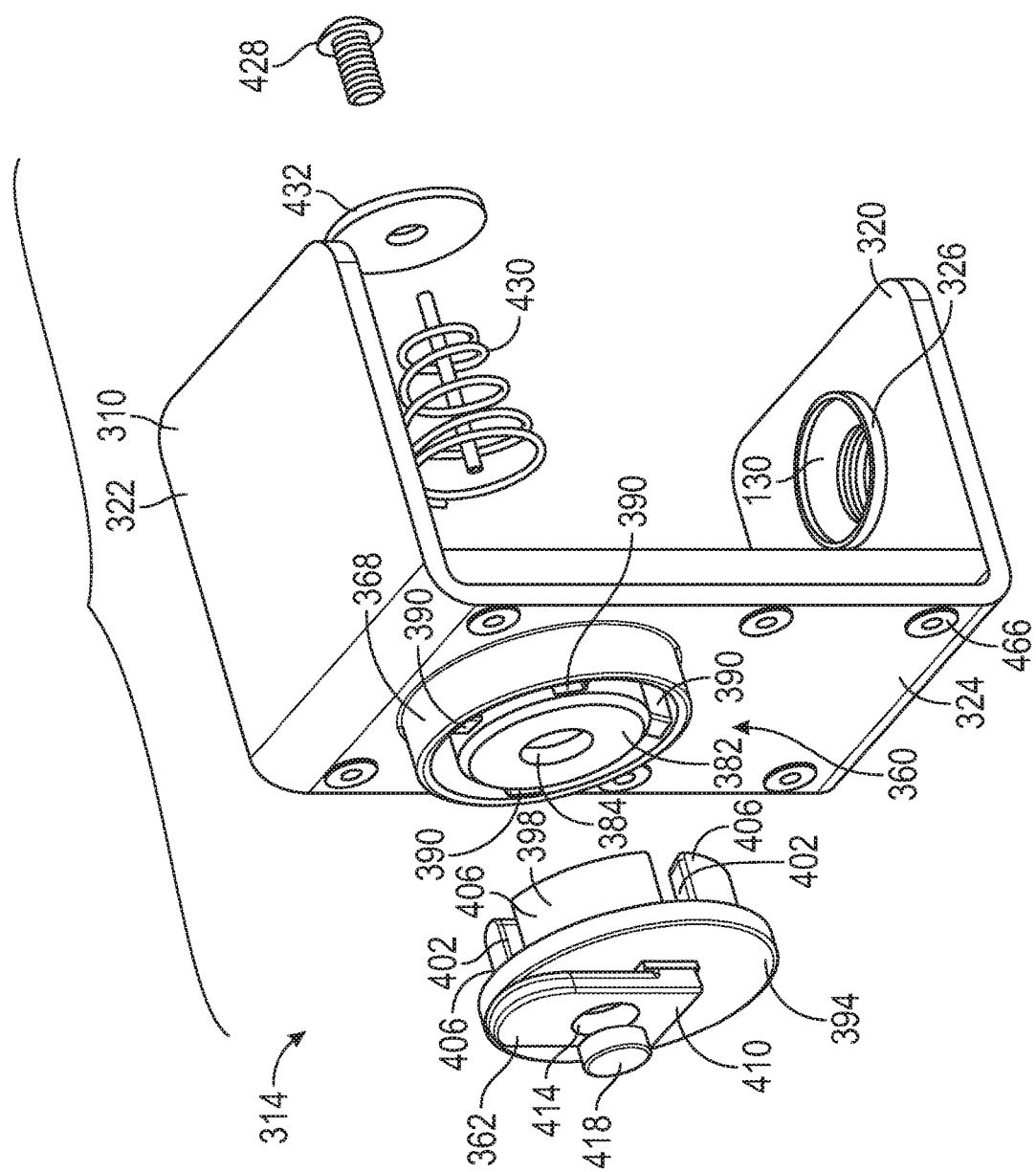
Figure 18:
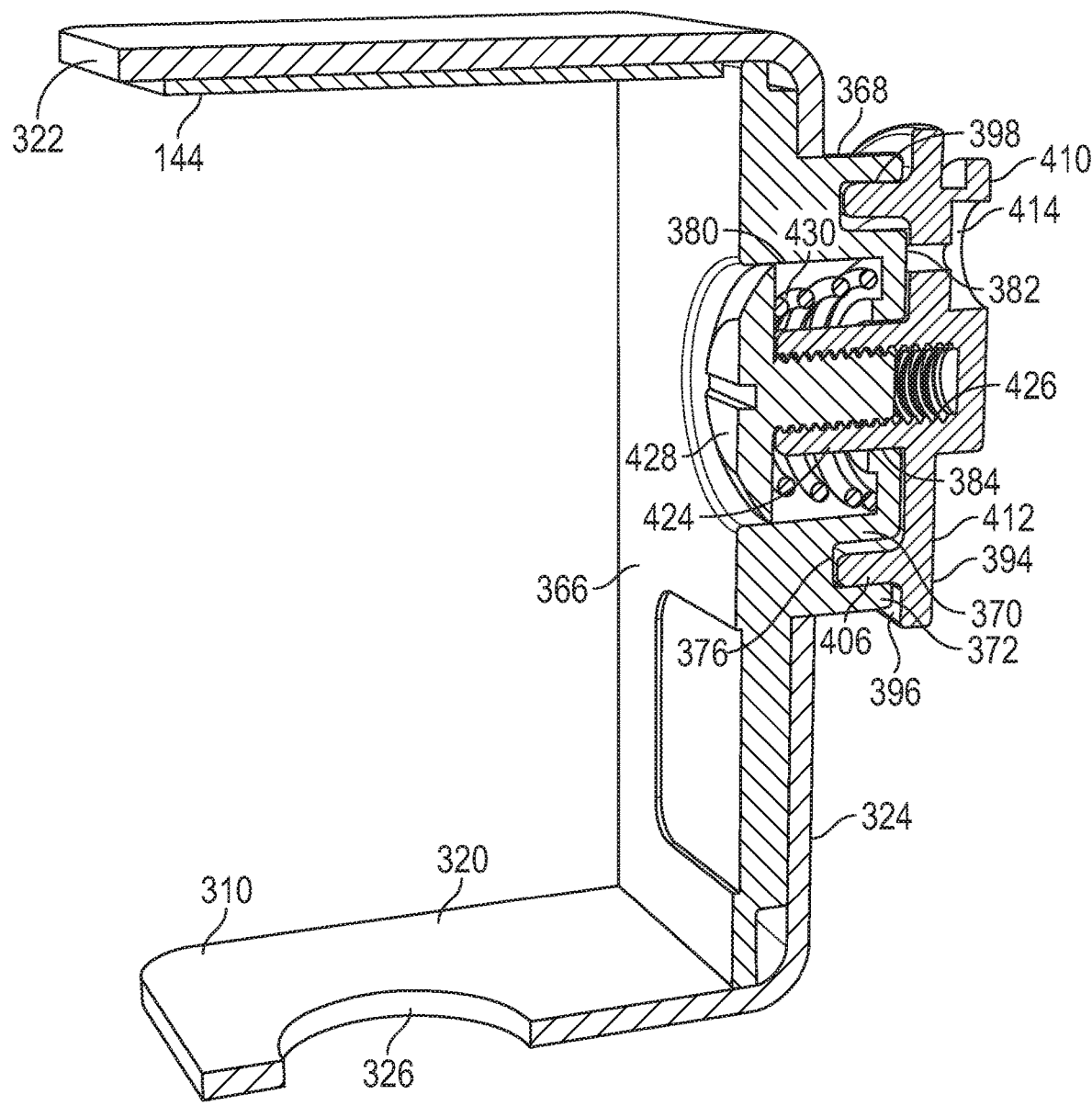
FIG. 18 is a cross-section of the clamp mechanism.

The connection of the mount assembly 114 to the clamp 110 is shown in FIGS. 16 and 17. In FIG. 16, the threaded insert 130 and the rubber pad 144 are first affixed to the respective bottom and top walls 320, 322 of the clamp 310. The plate 366 of the first mount 360 is fitted between the bottom and top walls 320, 322 and abutted against the sidewall 324, with the annular flange 368 projecting through the opening 328 of the sidewall 324. The sidewall 324 includes holes 462 which correspond with threaded apertures 464 located on the plate 366, and fasteners 466 extend through the holes and threadingly engage the apertures 464. In FIG. 17, with the first mount 360 fastened to the clamp 310, the second mount 362 is fitted to the annular flange 368 as described above. The spring 430 is slid over the boss 424 of the plate 394 extending through the opening 384 in the outer end wall 382. The washer 432 is placed on the fastener 428 which is then attached to the boss 424 to secure the spring 430. The magnet 418 is fitted in the recess 414 provided in the attachment member 410.

Figure 15:
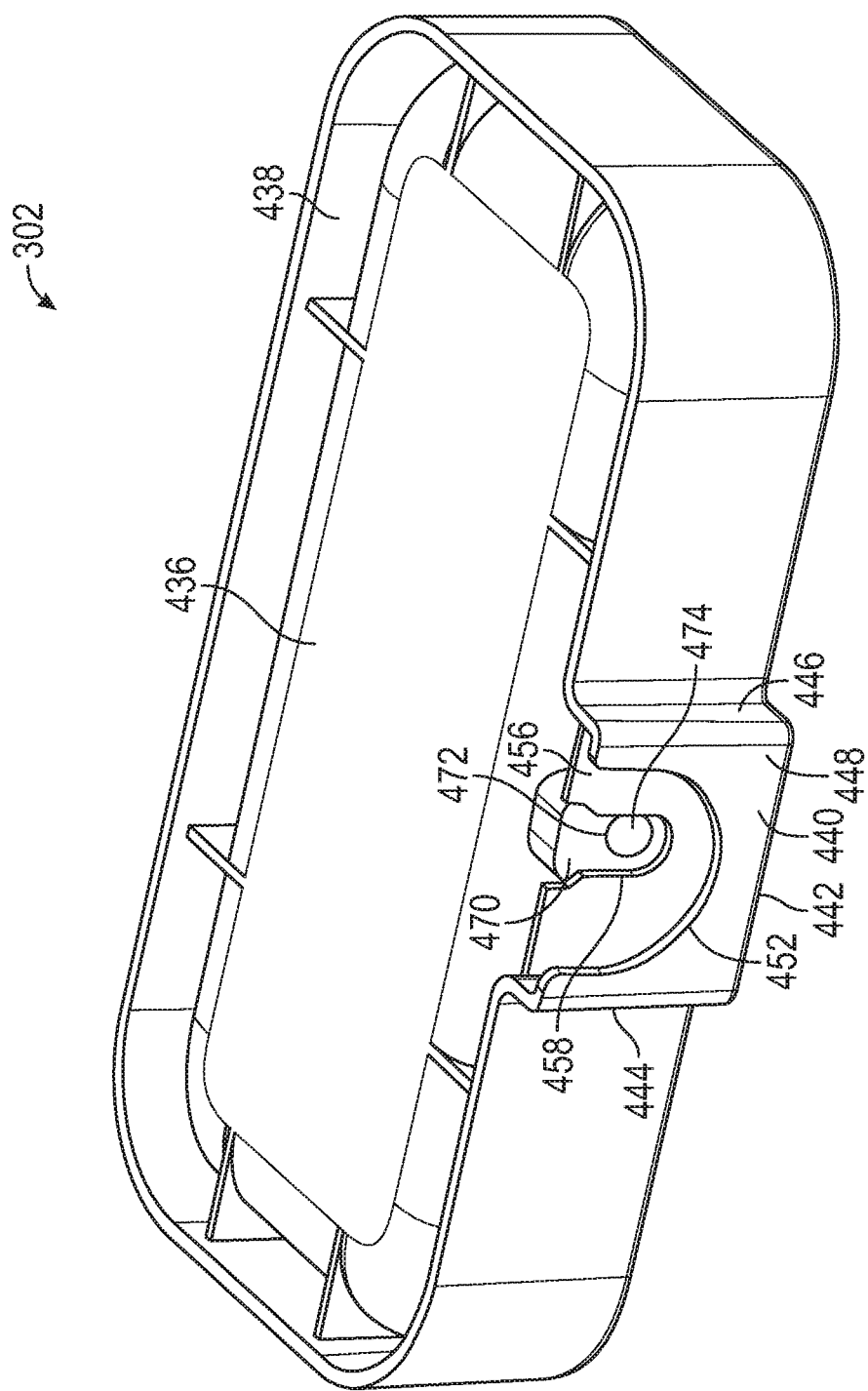
FIG. 15 is a perspective view of the tray showing connecting structure for the clamp mechanism.

FIG. 15 depicts a mounting feature of the tray 302. The tray 302 includes a bottom wall 436 and a sidewall 438. The sidewall 438 includes a housing 440 extending outwardly therefrom. The housing 440 has a top wall 442, opposed sidewalls 444, 446, and an outer end wall 448. The outer end wall 448 includes a first cutout 452 coved upward toward the top wall 442. The first cutout 452 exposes a divider 456 spaced between the sidewall 438 and the outer end wall 448, and more particularly, spaced between a sidewall mount 470 and the outer end wall 448. The divider 456 includes a second cutout 458 shaped to receive the attachment member 410 on the second mount 362, with the attachment member 410 received between the divider 456 and the sidewall mount 470. Further depicted, the sidewall mount 470 includes a recess 472 formed therein sized to securely receive a magnet 474 having a polarity opposite to that of the magnet 410. Therefore, the magnet 418 mounted to the attachment member 410 and the magnet 474 mount to the tray 302 further secures the tray 302 to the clamp mechanism 300.

Accordingly, the clamp mechanism 300 is configured to secure the tray 302 in at least two positions, a first position where, for example, the tray is faced upward (FIGS. 11 and 12) and a second position where, for example, the tray is faced sideways (FIG. 13). To move the tray 302 from the first position to the second position, the tray is pulled away from the clamp mechanism 300. This moves the second mount 362 out of engagement with the first mount 360 (i.e., moves the dividers 390 out of the cutouts 402), while also compressing the spring 430. The second mount 362 can then be rotated (via the tray 302) to the second position where the cutouts 402 are again aligned with the dividers 390. When aligned the second mount 362 can be moved back into engagement with the first mount 360. Further, because the spring 430 biases the second mount 362 against the first mount 360, the position of the tray 302 relative to the clamp mechanism 300 can be maintained.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A clamp mechanism comprising:
a clamp configured to receive an associated support structure;
a connecting assembly attached to the clamp, the connecting assembly includes an engagement member selectively moveably into engagement with the associated support structure for securing the associated support structure within the clamp; and
a mount assembly configured to secure an apparatus to the clamp, the mount assembly includes a first mount connected the clamp and a second mount provided as part of the apparatus and adapted to be rotationally indexed about an axis relative to the first mount to secure the apparatus in a plurality of positions relative to the clamp,
wherein a first magnet is secured to the first mount, and a second magnet having a polarity opposite to that of the first magnet is secured to the apparatus, the first and second magnets are located on the axis so as to further secure the apparatus to the clamp in each of the plurality of positions of the apparatus relative to the clamp.

2. The clamp assembly of claim 1, wherein the first mount includes wheel fixedly secured to a sidewall of the clamp, the wheel has a plurality of open-ended pockets arrayed around its periphery, and a plurality of spaced teeth is defined by the pockets.

3. The clamp assembly of claim 2, wherein the pockets selectively receive the second mount allowing for angular adjustment of the apparatus relative to the clamp.

4. The clamp assembly of claim 1, wherein the apparatus includes a housing dimensioned to receive the first mount, the second magnet is secured within the housing, and the second mount is defined by a mating tab provided within the housing for engaging the wheel.

5. The clamp assembly of claim 4, wherein each of the pockets is sized to receive the mating tab.

6. The clamp assembly of claim 4, wherein the second mount is further defined by a pair of contact tabs which flank the mating tab, each of the contact tabs configured to engage the wheel and position the wheel within the housing for engagement with the mating tab.

7. The clamp assembly of claim 1, wherein the first mount includes a first plate secured to the clamp, the first plate includes dividers that define the at least two positions of the apparatus secured to the clamp.

8. The clamp assembly of claim 7, wherein the second mount includes a second plate having a flange extending therefrom, the flange includes cutouts which separate the flange into spaced tabs, the cutouts are sized to receive the dividers and the tabs are sized to be received between the dividers.

9. The clamp assembly of claim 8, wherein an annular flange projects from the first plate, the dividers extending inwardly from the annular flange, and the flange of the second mount is received within the annular flange.

10. The clamp assembly of claim 8, wherein an attachment member for mounting of the apparatus to the second mount extends from the second plate.

11. The clamp assembly of claim 8, wherein a spring is secured to the first mount, the spring holds the second mount in engagement with the first mount.

12. A clamp mechanism comprising:
a clamp configured to receive an associated support structure;
a connecting assembly attached to the clamp, the connecting assembly includes an engagement member selectively moveably into engagement with the associated support structure for securing the associated support structure within the clamp; and
a mount assembly attached to the clamp and configured to secure an apparatus to the clamp, the mount assembly includes a first mount provided as part of the clamp and a second mount provided as part of the apparatus, the first and second mounts are configured to allow one of the first and second mounts to be rotationally indexed relative to the other of the first and second mounts to secure the apparatus in a plurality of positions relative to the clamp,
wherein the first mount includes a sprocket-shaped wheel fixedly secured to an exterior sidewall of the clamp, and an angular spacing between the plurality of positions is an angular measurement extending circumferentially about an axis defined by the wheel,
wherein the apparatus includes a housing configured to at least partially to receive the wheel, the housing having the second mount for selective engagement with the wheel,
wherein a first magnet is centrally secured to an outer surface of the wheel, and a second magnet having a polarity opposite to that of the first magnet is secured within the housing, the first and second magnets further secure the apparatus to the clamp in each of the plurality of positions of the apparatus relative to the clamp.

13. The clamp assembly of claim 12, wherein the first mount includes wheel fixedly secured to a sidewall of the clamp, the wheel has a plurality of open-ended pockets arrayed around its periphery, and a plurality of spaced teeth is defined by the pockets, the pockets selectively receive the second mount allowing for angular adjustment of the apparatus relative to the clamp.

14. The clamp assembly of claim 13, wherein the apparatus includes a housing dimensioned to receive the wheel of the first mount, and the second mount is defined by a mating tab provided within the housing for engaging the wheel, and when in an engaged state the mating tab is received in one of the pockets.

\* \* \* \* \*